United States Patent
Fukuta et al.

(10) Patent No.: US 9,992,002 B2
(45) Date of Patent: Jun. 5, 2018

(54) USER TERMINAL, RADIO ACCESS NETWORK, AND COMMUNICATION CONTROL METHOD

(71) Applicant: KYOCERA CORPORATION, Kyoto (JP)

(72) Inventors: Noriyoshi Fukuta, Yokohama (JP); Chiharu Yamazaki, Tokyo (JP); Henry Chang, San Diego, CA (US); Amit Kalhan, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 93 days.

(21) Appl. No.: 14/910,871

(22) PCT Filed: Aug. 4, 2014

(86) PCT No.: PCT/JP2014/070531
§ 371 (c)(1),
(2) Date: Feb. 8, 2016

(87) PCT Pub. No.: WO2015/020018
PCT Pub. Date: Feb. 12, 2015

(65) Prior Publication Data
US 2016/0191221 A1    Jun. 30, 2016

Related U.S. Application Data

(60) Provisional application No. 61/883,619, filed on Sep. 27, 2013, provisional application No. 61/864,186, filed on Aug. 9, 2013.

(51) Int. Cl.
*H04L 5/00* (2006.01)
*H04W 72/04* (2009.01)
(Continued)

(52) U.S. Cl.
CPC .......... *H04L 5/0053* (2013.01); *H04L 1/1812* (2013.01); *H04L 5/001* (2013.01);
(Continued)

(58) Field of Classification Search
None
See application file for complete search history.

(56) References Cited

U.S. PATENT DOCUMENTS

2013/0010721 A1* 1/2013 Aiba .................... H04L 1/1812
370/329
2013/0010743 A1* 1/2013 Ahn .................... H04L 1/1621
370/329
(Continued)

FOREIGN PATENT DOCUMENTS

WO    2012/118356 A2    9/2012

OTHER PUBLICATIONS

International Search Report issued in PCT/JP2014/070531; dated Oct. 14, 2014.
(Continued)

*Primary Examiner* — Robert C. Scheibel
(74) *Attorney, Agent, or Firm* — Studebaker & Brackett PC

(57) ABSTRACT

A user terminal according to a first feature performs uplink communication with a radio access network by simultaneously using a plurality of carriers. The plurality of carriers include a first carrier used for mobility control of the user terminal, and a second carrier that provides radio communication in coordination with the first carrier. The first carrier includes a first physical uplink control channel region provided at each of both end portions in a frequency direction of the first carrier. The second carrier includes a second physical uplink control channel region provided at a center frequency side of the second carrier away from each of both end portions in a frequency direction of the second carrier.

10 Claims, 9 Drawing Sheets

(51) Int. Cl.
| | |
|---|---|
| *H04W 16/32* | (2009.01) |
| *H04W 76/02* | (2009.01) |
| *H04L 1/18* | (2006.01) |
| *H04W 74/08* | (2009.01) |

(52) U.S. Cl.
CPC .......... *H04L 5/0055* (2013.01); *H04W 16/32* (2013.01); *H04W 72/0413* (2013.01); *H04W 74/0833* (2013.01); *H04W 76/025* (2013.01)

(56) References Cited

U.S. PATENT DOCUMENTS

| | | | | |
|---|---|---|---|---|
| 2013/0279459 A1* | 10/2013 | Lee | ....................... | H04L 1/0029 370/329 |
| 2015/0049699 A1* | 2/2015 | Takeda | .................... | H04J 11/00 370/329 |
| 2015/0109932 A1* | 4/2015 | Goldhamer | ....... | H04W 72/0453 370/236 |
| 2015/0257150 A1* | 9/2015 | Yi | ........................... | H04B 7/26 370/329 |

OTHER PUBLICATIONS

Written Opinion issued in PCT/JP2014/070531; dated Oct. 14, 2014.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP; TS 36300; V11.6.0; Jun. 2013; pp. 1-209; Release 11; 3GPP Organizational Partners.

Hitachi Ltd.; Discussion on uplink aspect for carrier aggregated NCT; 3GPP TSG RAN WG1 Meeting #73, R1-132263; Fukuoka, Japan, May 20-24, 2013.

IAESI, CEA, DAC-UPC, Czech Technical University in Prague; Asymmetry-based spectrum utilization and coordination: TDD within FDD; 3GPP TSG-RAN WG1 Meeting #72bis, R1-131356; Chicago, U.S.A., Apr. 15-19, 2013.

NTT DOCOMO; Physical Layer Design for Dual Connectivity; 3GPP TSG RAN WG1 Meeting #72, R1-130409; St Julian's, Malta, Jan. 28-Feb. 1, 2013.

Pantech; Remaining details for UCI transmission on PUCCH; 3GPP TSG RAN1 #65, R1-111644; Barcelona, Spain, May 9-May 13, 2011.

Intel Corporation; Radio link failure handling for dual connectivity; 3GPP TSG RAN WG2 Meeting #82, R2-131990; Fukuoka, Japan, May 20-25, 2013.

Sharp; PCell vs. SCell with PUCCH for inter-eNB CA; 3GPP TSG-RAN WG2#82; R2-132052; Fukuoka, Japan, May 20-24, 2013.

Communication issued in by the European Patent Office in corresponding EP Appln No. 14834127-18573 on Mar. 9, 2017; 10pp.

ZTE Corporation; "Discussion on challenge and possible solution on small cell"; 3GPP TSG RAN Meeting #81bis; Chicago, USA; Apr. 15-19, 2013; R2-130950; 6pp.

* cited by examiner

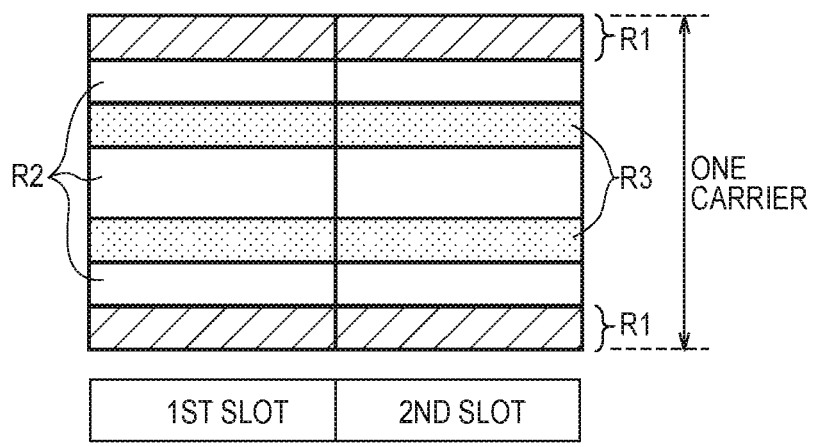
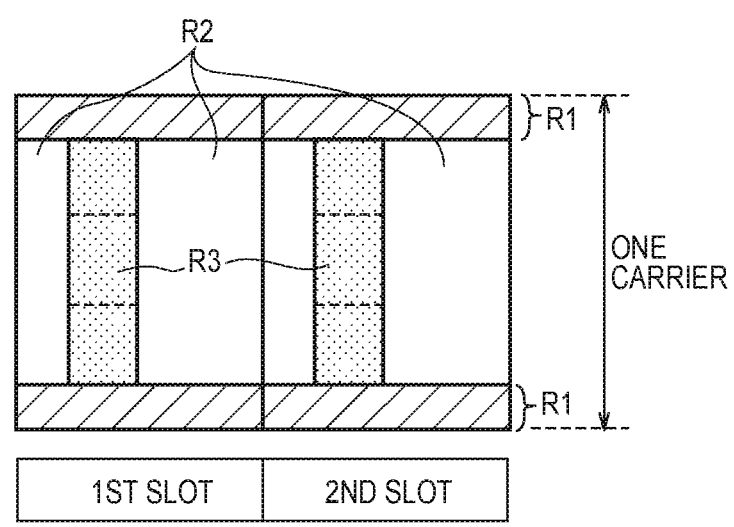

USER TERMINAL, RADIO ACCESS NETWORK, AND COMMUNICATION CONTROL METHOD

TECHNICAL FIELD

The present invention relates to a user terminal, a radio access network, and a communication control method that perform radio communication by simultaneously using a plurality of carriers.

BACKGROUND ART

In 3GPP (3rd Generation Partnership Project), which is a project aiming to standardize a mobile communication system, carrier aggregation has been introduced (see Non-patent document 1). Furthermore, in 3GPP, the introduction of a dual connectivity has been discussed.

In the carrier aggregation and the dual connectivity, a user terminal performs radio communication with a radio access network by simultaneously using a plurality of carriers (a plurality of frequency bands). The plurality of carriers include a first carrier used for mobility control of the user terminal, and a second carrier that provides the radio communication in coordination with the first carrier.

In carrier aggregation, the scheduling in each carrier is performed by one base station (that is, one scheduler). In contrast, in a dual connectivity, the scheduling in each carrier is performed by different base stations (that is, different schedulers).

PRIOR ART DOCUMENT

Non-Patent Document

[Non-patent document 1] 3GPP technical specification "TS 36.300 V11.6.0" July, 2013

SUMMARY OF INVENTION

A user terminal transmits a control signal corresponding to a second carrier (for example, HARQ Ack/Nack, a downlink channel state report) in a physical uplink control channel region of a first carrier.

However, in the above-described dual connectivity, a first base station connected with the user terminal via the first carrier must transfer the control signal corresponding to the second carrier to a second base station connected with the user terminal via the second carrier.

As a result, there is an increase in a signaling amount and a delay accompanying the transfer, thus causing a problem whereby an effective communication control cannot be realized.

Thus, an object of the present invention is to be able to realize an effective communication control in a case where a plurality of carriers are used simultaneously in radio communication.

A user terminal according to a first aspect performs uplink communication with a radio access network by simultaneously using a plurality of carriers. The plurality of carriers include a first carrier used for mobility control of the user terminal, and a second carrier that provides radio communication in coordination with the first carrier. The first carrier includes a first physical uplink control channel region provided at each of both end portions in a frequency direction of the first carrier. The second carrier includes a second physical uplink control channel region provided at a center frequency side of the second carrier away from each of both end portions in a frequency direction of the second carrier.

A communication control method according to a second aspect is a method in a user terminal that establishes RRC connection with a master base station and to which radio resources are assigned by each of the master base station and a secondary base station. The communication control method includes: a step A of detecting a failure of a radio link between the user terminal and the secondary base station; and a step B of transmitting a radio link failure report about the detected failure, to the master base station.

A communication control method according to a third aspect is a method in a user terminal that establishes RRC connection with a master base station. The communication control method includes: a step A of transmitting a random access preamble for a random access, to a secondary base station; and a step B of receiving a random access response corresponding to the random access preamble from the secondary base station, without receiving the random access response from the master base station.

A communication control method according to a fourth aspect includes: a step A of performing a random access to a secondary base station, by a user terminal that establishes RRC connection with a master base station; a step B of detecting a failure in the random access, by the user terminal or the secondary base station; and a step C of transmitting, to the master base station, a random access failure report about the detected failure, by the user terminal or the secondary base station.

BRIEF DESCRIPTION OF DRAWINGS

FIG. 11 is a diagram illustrating the uplink subframe illustrating a first modification of the PUCCH region for the SeNB according to the embodiment.

FIG. 12 is a diagram illustrating the uplink subframe illustrating a second modification of the PUCCH region for the SeNB according to the embodiment.

DESCRIPTION OF EMBODIMENTS

Overview of Embodiments

Figure 1:
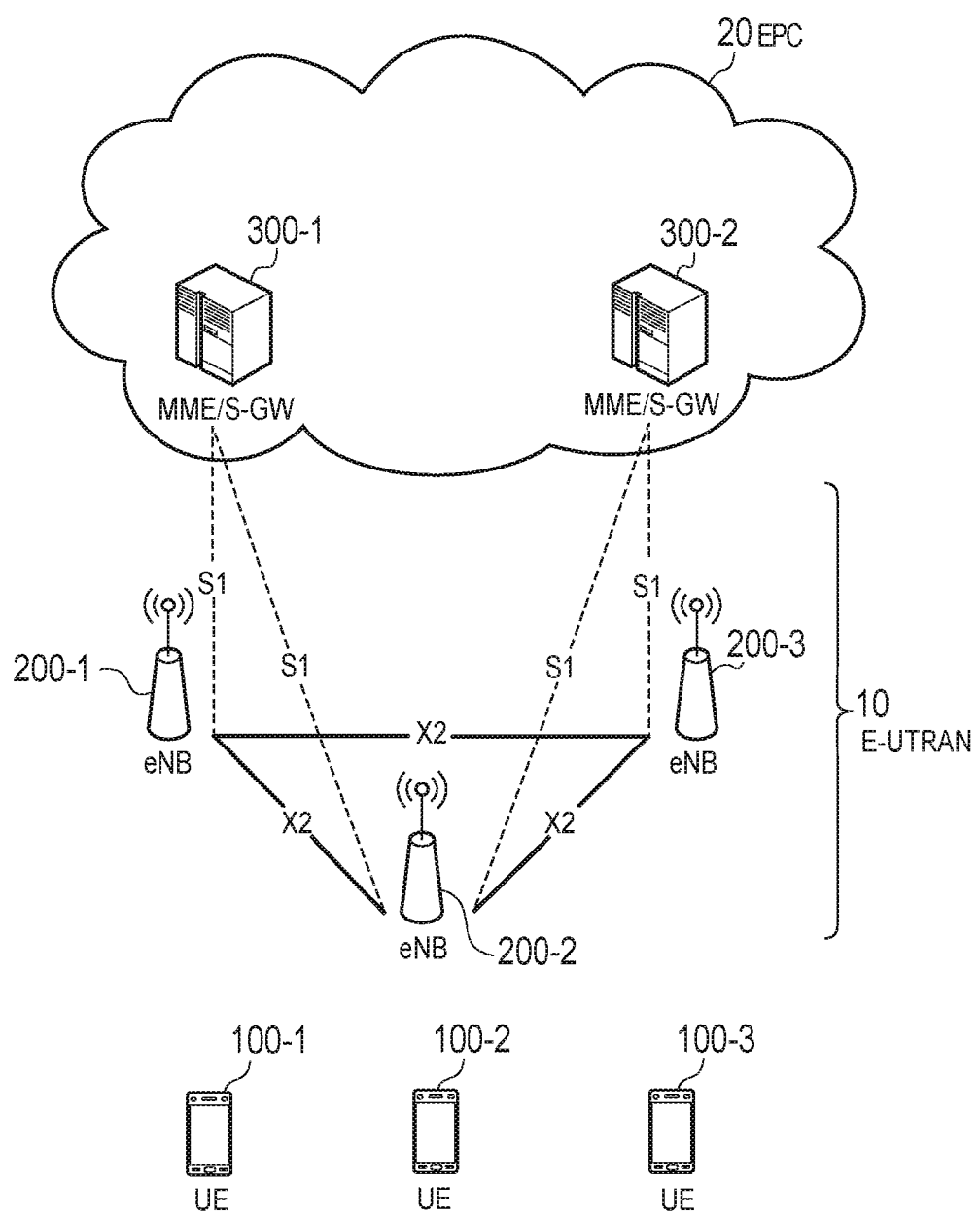
FIG. 1 is a diagram illustrating an LTE system (a mobile communication system) according to an embodiment.

A user terminal according to embodiments performs uplink communication with a radio access network by simultaneously using a plurality of carriers. The plurality of carriers include a first carrier used for mobility control of the user terminal, and a second carrier that provides radio communication in coordination with the first carrier. The first carrier includes a first physical uplink control channel region provided at each of both end portions in a frequency direction of the first carrier. The second carrier includes a second physical uplink control channel region provided at a center frequency side of the second carrier away from each of both end portions in a frequency direction of the second carrier.

In embodiments, the user terminal comprises a receiver that receives, via the first carrier, or via a downlink carrier that forms a pair with the first carrier, configuration information concerning the second physical uplink control channel region.

In embodiments, a physical uplink control channel format applied to the second physical uplink control channel region is different from a physical uplink control channel format applied to the first physical uplink control channel region.

In embodiments, the user terminal comprises a transmitter that transmits HARQ Ack/Nack corresponding to the second carrier, in the second physical uplink control channel region.

In embodiments, the user terminal comprises a transmitter that transmits a downlink channel state report corresponding to the second carrier, in the second physical uplink control channel region.

In embodiments, the user terminal comprises a controller that performs control so as to transmit a downlink channel state report corresponding to the second carrier after the radio communication using the second carrier becomes available, in the second physical uplink control channel region.

In embodiments, the transmitter further transmits a downlink channel state report corresponding to the first carrier, in the first physical uplink control channel region. A cycle in which a downlink channel state report corresponding to the second carrier is transmitted is different from a cycle in which the downlink channel state report corresponding to the first carrier is transmitted.

In embodiments, the second carrier further includes a first physical uplink control channel region provided at each of both end portions in a frequency direction of the second carrier. The second physical uplink control channel region is provided adjacently to the first physical uplink control channel region included in the second carrier.

In embodiments, only when a bandwidth of the second carrier is wider than a predetermined bandwidth, the second physical uplink control channel region is provided in the second carrier.

In embodiments, the second carrier can operate as a first carrier used in mobility control of another user terminal. The second carrier further includes a first physical uplink control channel region provided at each of both end portions in a frequency direction of the second carrier. Another user terminal transmits at least one of the HARQ Ack/Nack corresponding to the second carrier and a downlink channel state report corresponding to the second carrier, in the first physical uplink control channel region included in the second carrier. The user terminal can connect to the radio access network with which the other user terminal can connect.

A radio access network according to embodiments performs uplink communication with a user terminal by simultaneously using a plurality of carriers. The plurality of carriers include a first carrier used for mobility control of the user terminal, and a second carrier that provides radio communication in coordination with the first carrier. The first carrier includes a first physical uplink control channel region provided at each of both end portions in a frequency direction of the first carrier. The second carrier includes a second physical uplink control channel region provided at a center frequency side of the second carrier away from each of both end portions in a frequency direction of the second carrier.

A processor according to embodiments is provided in a user terminal that performs uplink communication with a radio access network by simultaneously using a plurality of carriers. The plurality of carriers include a first carrier used for mobility control of the user terminal, and a second carrier that provides radio communication in coordination with the first carrier. The first carrier includes a first physical uplink control channel region provided at each of both end portions in a frequency direction of the first carrier. The second carrier includes a second physical uplink control channel region provided at a center frequency side of the second carrier away from each of both end portions in a frequency direction of the second carrier.

A communication control method according to embodiments is a method in a user terminal that establishes RRC connection with a master base station and to which radio resources are assigned by each of the master base station and a secondary base station. The communication control method includes: a step A of detecting a failure of a radio link between the user terminal and the secondary base station; and a step B of transmitting a radio link failure report about the detected failure, to the master base station. In the step B, the user terminal transmits the radio link failure report to the master base station only when the user terminal detects the failure in a specific cell of the secondary base station in the step A. The specific cell is a cell to which a physical uplink control channel of the user terminal is provided, among cells of the secondary base station.

A communication control method according to embodiments is a method in a user terminal that establishes RRC connection with a master base station. The communication control method includes: a step A of transmitting a random access preamble for a random access, to a secondary base station; and a step B of receiving a random access response corresponding to the random access preamble from the secondary base station, without receiving the random access response from the master base station. In the step A, the user terminal transmits the random access preamble to a specific cell of the secondary base station. In the step B, the user terminal receives the random access response from the specific cell. The specific cell is a cell to which a physical uplink control channel of the user terminal is provided, among cells of the secondary base station.

A communication control method according to embodiments includes: a step A of performing a random access to a secondary base station, by a user terminal that establishes RRC connection with a master base station; a step B of detecting a failure in the random access, by the user terminal or the secondary base station; and a step C of transmitting, to the master base station, a random access failure report about the detected failure, by the user terminal or the secondary base station.

In the step C, the user terminal transmits the random access failure report to the master base station only when the user terminal detects the failure in a specific cell of the secondary base station in the step B. The specific cell is a cell to which a physical uplink control channel of the user terminal is provided, among cells of the secondary base station.

Embodiments

Hereinafter, an embodiment for applying the present invention to an LTE system is explained.

(System Architecture)

FIG. 1 is a diagram illustrating the LTE system according to the embodiment. As illustrated in FIG. 1, the LTE system according to the embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell) with which a connection is established. The architecture of the UE 100 will be described later.

The E-UTRAN 10 corresponds to a radio access network. The E-UTRAN 10 includes eNB 200 (evolved Node-B). The eNB 200 corresponds to a base station. The eNBs 200 are connected mutually via an X2 interface. The architecture of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function of user data, and a measurement control function for mobility control and scheduling. The "cell" is used as a term indicating a smallest unit of a radio communication area, and is also used as a term indicating a function of performing radio communication with the UE 100.

The EPC 20 corresponds to a core network. A network of the LTE system is configured by the E-UTRAN 10 and the EPC 20. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface.

Figure 2:
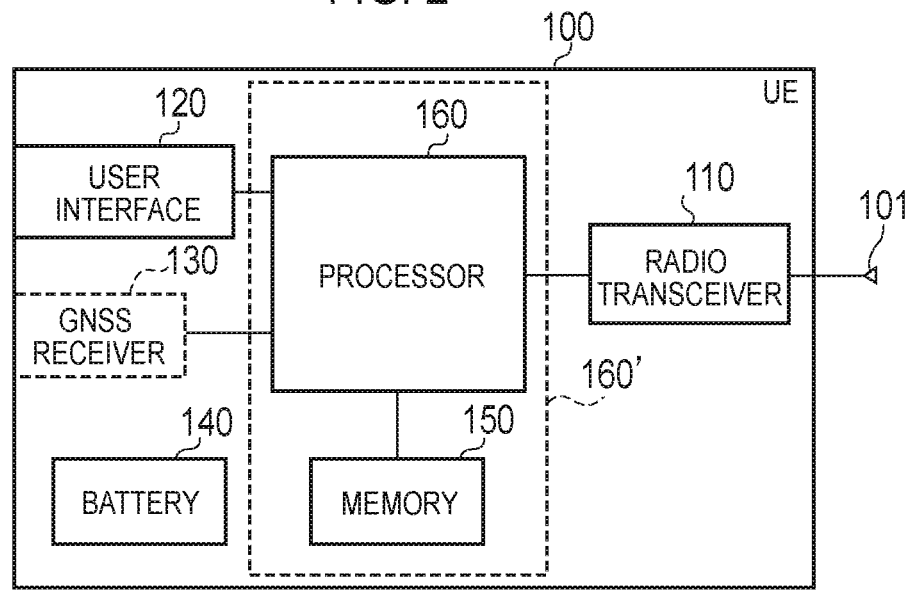
FIG. 2 is a block diagram illustrating UE (user terminal) according to the embodiment.

FIG. 2 is a block diagram illustrating the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a controller of the UE 100. The UE 100 may not necessarily include the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
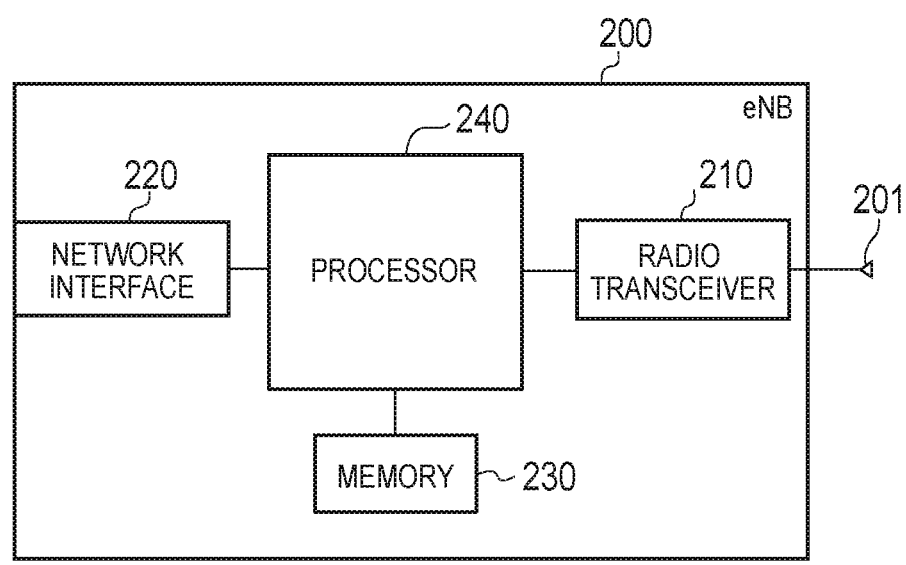
FIG. 3 is a block diagram illustrating eNB (base station) according to the embodiment.

FIG. 3 is a block diagram illustrating the eNB 200. As illustrated in FIG. 3, the eNB 200 includes an antenna 201, a radio transceiver 210, a network interface 220, a memory 230, and a processor 240. The memory 230 and the processor 240 configure a controller of the eNB 200.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
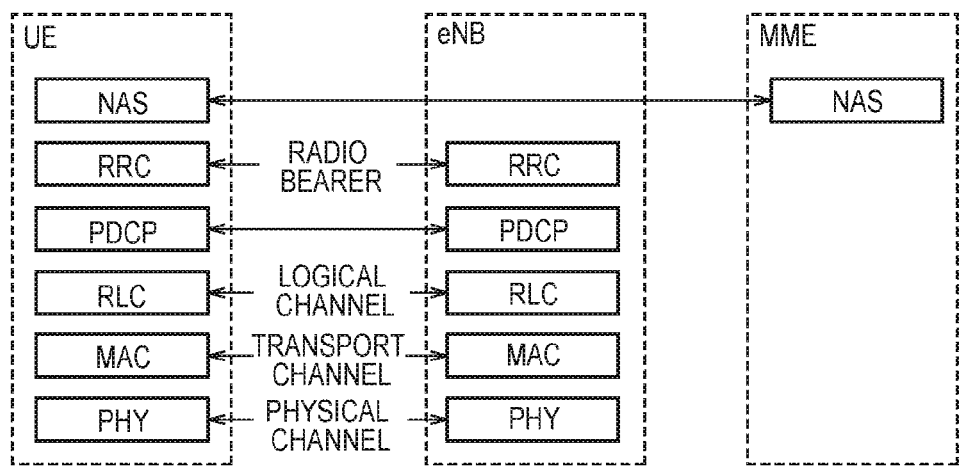
FIG. 4 is a protocol stack diagram illustrating a radio interface according to the embodiment.

FIG. 4 is a protocol stack diagram illustrating a radio interface in the LTE system. As illustrated in FIG. 4, the radio interface protocol is classified into a first layer to a third layer (L1 to L3) of an OSI reference model, such that the first layer is a physical (PHY) layer. The second layer includes a MAC (Media Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, and a retransmission process and the like by a hybrid ARQ (HARQ). Between the MAC layer of the UE 100 and the MAC layer of the eNB 200, user data and control signals are transmitted via a transport channel. The MAC layer of the eNB 200 includes a scheduler for determining (scheduling) a transport format (a transport block size and a modulation and coding scheme) of an uplink and a downlink, resource blocks to be assigned to the UE 100, and a transmission power.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls the logical channel, the transport channel, and the physical channel according to the establishment, re-establishment, and release of a radio bearer. When there is a connection (RRC connection) between the RRC of the UE 100 and the RRC of the eNB 200, the UE 100 is in a connected state (RRC connected state). Otherwise, the UE 100 is in an idle state (RRC idle state).

An NAS (Non-Access Stratum) layer positioned above the RRC layer performs session management, mobility management and the like.

Figure 5:
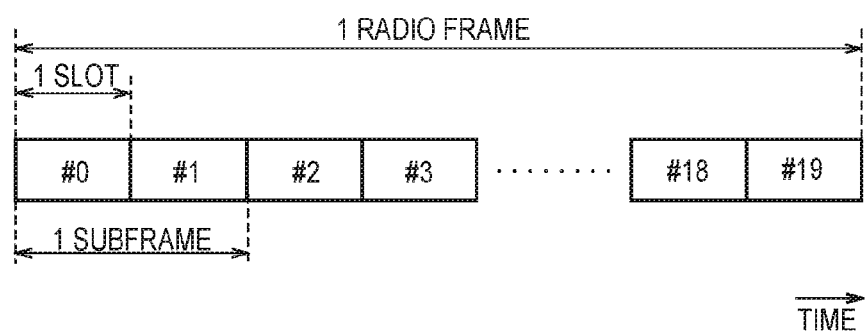
FIG. 5 is a diagram illustrating a radio frame according to the embodiment.

FIG. 5 is a diagram illustrating a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively. TDD (Time Division Duplex) or FDD (Frequency Division Duplex) is applied as a duplex scheme.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. A resource element is configured by one subcarrier and one symbol.

Of the radio resources assigned to the UE 100, a frequency resource is configured by a resource block, and a time resource is configured by a subframe (or a slot).

In the downlink, an interval of several symbols at the head of each subframe is a PDCCH region used as a physical downlink control channel (PDCCH) for mainly transmitting a downlink control signal. Furthermore, the remaining portion of each subframe is a PDSCH region available as a physical downlink shared channel (PDSCH) for mainly transmitting downlink user data.

In the uplink, each of both end portions in a frequency direction of each subframe is a PUCCH region (first physical uplink control channel region) used as a physical uplink control channel (PUCCH) for mainly transmitting an uplink control signal. The remaining portion of each subframe is a PUSCH region available as a physical uplink shared channel (PUSCH) for mainly transmitting uplink user data.

The PUCCH carries control signals. The control signals, for example, include CQI (Channel Quality Indicator), PMI (Precoding Matrix Indicator), RI (Rank Indicator), SR (Scheduling Request), and HARQ Ack/Nack (hereinafter, simply called "Ack/Nack").

The CQI is information indicating downlink channel quality and is used for deciding a recommended modulation method and a coding rate to be used in downlink transmission, and the like. The PMI is information indicating a precoder matrix that is preferable to be used for the downlink transmission. The RI is information indicating the number of layers (the number of streams) available for the downlink transmission. The CQI/PMI/RI correspond to a downlink channel state (CSI: Channel State Information) report. The downlink CSI report is generated based on a downlink reference signal and the like. The downlink reference signal is either a cell-specific reference signal (CRS) or a CSI reference signal (CSI-RS) and the like.

The SR is information for requesting the assignment of an uplink radio resource (a resource block). The Ack/Nack is information indicating whether or not a signal transmitted via a downlink physical channel (for example, the PDSCH) has been successfully decoded.

Figure 6:
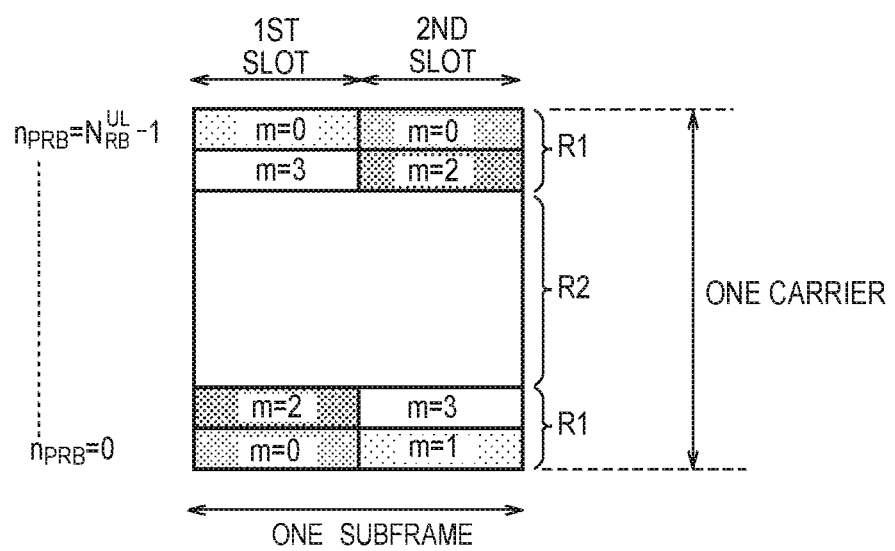
FIG. 6 is a diagram illustrating an uplink subframe in the LTE system.

FIG. 6 is a diagram illustrating an uplink subframe in the LTE system.

As illustrated in FIG. 6, each subframe includes two slots, and each slot includes resource blocks of a number that is in accordance with the uplink bandwidth (a first carrier bandwidth) of the cell. In the case of the normal CP (Cyclic Prefix) setting, a resource block is configured by 12 subcarriers and seven SC-FDMA symbols.

A PUCCH region R1 is provided at each of both end portions in the frequency direction of each subframe. The radio resources included in the PUCCH region R1 are assigned to the UE 100 as PUCCH resources. A PUSCH region is provided in the remaining portion of each subframe. The radio resources included in a PUSCH region R2 are assigned to the UE 100 as PUSCH resources.

One PUCCH resource uses one resource block at a time in the two slots within the subframe. Furthermore, frequency hopping is applied between the slots in a subframe, and a diversity effect is obtained between slots. A PUCCH resource is identified by a resource index m. Furthermore, a plurality of formats (PUCCH formats) are supported, and in each PUCCH format, control signals of different types are transmitted as shown below. Furthermore, the number of bits of the control signal that can be transmitted in one subframe is different for each PUCCH format.

PUCCH format 1: SR
PUCCH format 1a/1b: Ack/Nack
PUCCH format 2: CQI/PMI/RI
PUCCH format 2a/2b: CQI/PMI/RI and Ack/Nack In addition, in LTE-Advanced, a PUCCH format 3 is specified for transmitting the several Ack/Nacks.

Focusing on the modulation method, BPSK (Binary Phase Shift Keying) is applicable to the PUCCH format 1a, and mainly QPSK (Quadrature Phase Shift Keying) is applicable to the other PUCCH formats.

In the example shown in FIG. 6, a resource index m is used in an ascending order in the PUCCH formats 2, 2a, 2b, followed by the use in the PUCCH formats 1, 1a, 1b. That is, the PUCCH resources to which the PUCCH formats 2, 2a, 2b are applicable are provided on an outer side of the PUCCH resources to which the PUCCH formats 1, 1a, 1b are applicable.

(Operation Environment According to Embodiment)

Figure 7:
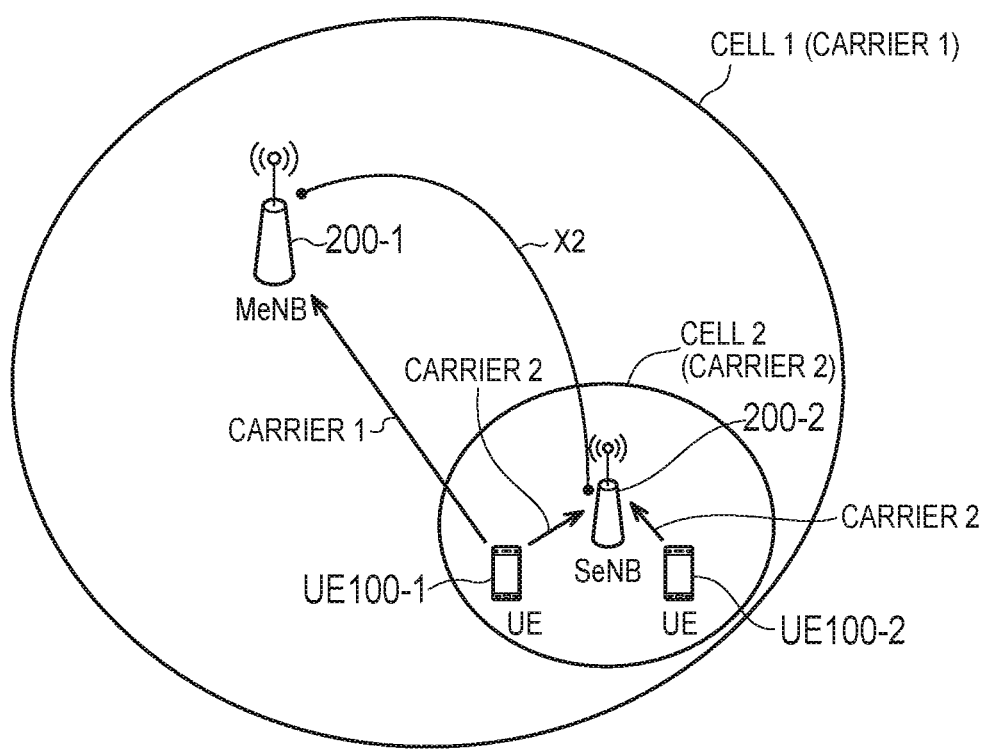
FIG. 7 is a diagram illustrating an operation environment according to the embodiment.

FIG. 7 is a diagram illustrating an operation environment according to the embodiment. In the embodiment, the explanation is mainly focused on the uplink.

As illustrated in FIG. 7, macro eNB (MeNB) 200-1 manages a cell 1 belonging to a carrier 1 (a first carrier). Small eNB (SeNB) 200-2 manages a cell 2 belonging to a carrier 2 (a second carrier). The MeNB may be referred as a master eNB (a master base station). The SeNB may be referred as a secondary eNB (a secondary base station). The carrier 2 corresponds to "specific cell" managed by the SeNB. The carrier 2 (specific cell) may be one of carriers (one of cells) of SeNB.

In TDD, the carrier 1 is a common carrier in the uplink and the downlink, and the carrier 2 is a common carrier in the uplink and the downlink.

On the other hand, in FDD, the carrier 1 is an uplink carrier $f_{UL1}$, and the MeNB 200-1 further manages a downlink carrier $f_{DL1}$ that forms a pair with the carrier 1. Furthermore, in FDD, the carrier 2 is an uplink carrier $f_{UL2}$, and the SeNB 200-2 further manages a downlink carrier $f_{DL2}$ that forms a pair with the carrier 2.

The cell 2 is a small cell having a smaller coverage than the cell 1 (a macro cell), and is called a pico cell or a femto cell. The SeNB 200-2 may also be a home eNB (HeNB). The cell 2 is provided within the coverage of the cell 1. The MeNB 200-1 and the SeNB 200-2 have a neighboring relationship with each other, and are mutually connected.

Furthermore, the LIE system according to the embodiment supports a dual connectivity (Dual connectivity). The UE 100-1 establishes a dual connectivity with a pair of eNB 200 (the MeNB 200-1 and the SeNB 200-2). By performing radio communication with a pair of eNBs 200, the UE 100-1 can perform radio communication having a high speed and large capacity as compared to the case when radio communication is performed with only one eNB 200.

The MeNB 200-1 performs a mobility control (Mobility management) of the UE 100-1. The MeNB 200-1 establishes an RRC connection with the UE 100-1, and performs a handover control and the like for the UE 100-1. In contrast, the SeNB 200-2 does not perform a mobility control of the UE 100-1. The SeNB 200-2 may establish a connection (an L2 connection) with the UE 100-1 up to at least the MAC layer or the RLC layer, and may not necessarily establish an RRC connection (an L3 connection).

The UE 100-1 performs uplink communication with the E-UTRAN 10 by simultaneously using a plurality of carriers (the carrier 1 and the carrier 2), and the scheduling in each carrier is performed by different eNBs 200 (the MeNB 200-1 and the SeNB 200-2). That is, each of the MeNB 200-1 and the SeNB 200-2 performs scheduling of the radio resources for the UE 100-1.

Thus, the carrier 1 is used in the mobility control of the UE 100-1. Focusing on the UE 100-1, the carrier 1 corresponds to PCC (Primary Component Carrier), and the cell 1 corresponds to PCell (Primary Cell).

The carrier 2 provides radio communication to the UE 100-1 in coordination with the carrier 1. Focusing on the UE 100-1, the carrier 2 corresponds to SCC (Secondary Component Carrier), and the SeNB 200-2 corresponds to SCell (Secondary Cell).

On the other hand, the UE 100-2 establishes a connection (an RRC connection) with only the SeNB 200-2. Focusing on the UE 100-2, the carrier 2 corresponds to the PCC and the cell 2 corresponds to the PCell.

(PUCCH Region According to Embodiment)

According to the current specifications, as regards the UE 100 that uses a carrier as the SCell (SCC), a PUCCH region that can be used by the UE 100 is not provided in the carrier. Thus, the UE 100 transmits the control signal (the Ack/Nack, a downlink CSI report) corresponding to the SCell (SCC) in the PUCCH region of the PCell (PCC).

However, in the dual connectivity, when the MeNB 200-1 that manages the PCell (PCC) of the UE 100-1 receives, from the UE 100-1, the control signal corresponding to the SCell (SCC) of the UE 100-1, the MeNB 200-1 must transfer the control signal to the SeNB 200-2 that manages the SCell (SCC). As a result, there is an increase in a signaling amount and a delay accompanying the transfer, whereby an effective communication control cannot be realized.

Thus, in the embodiment, by providing a new PUCCH region in the SCell (SCC), the control signal corresponding to the SCell can be transmitted in the new PUCCH region.

Figure 8:
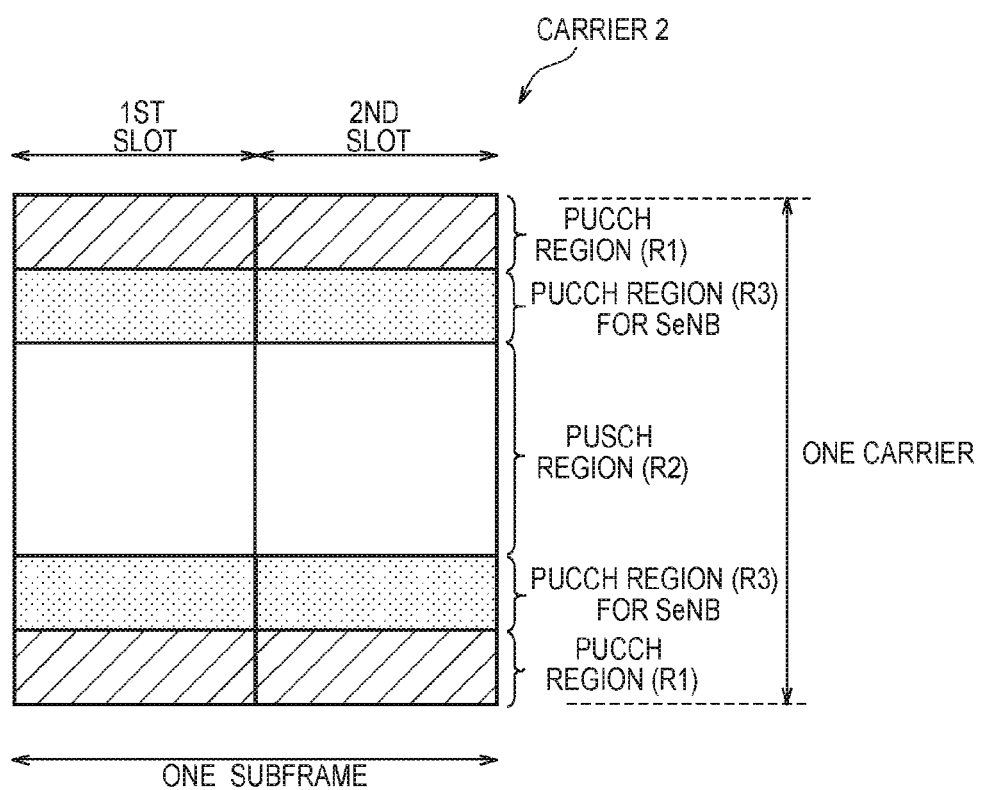
FIG. 8 is a diagram illustrating the uplink subframe according to the embodiment.

FIG. 8 is a diagram illustrating an uplink subframe according to the embodiment. Here, the architecture of the subframe of the carrier 2 illustrated in FIG. 7 will be described.

As illustrated in FIG. 8, in addition to the PUCCH region R1 provided at each of both end portions in the frequency direction of the carrier 2, the subframe of the carrier 2 includes PUCCH region R3 for the SeNB (PUCCH region for the SCell) that is provided at a center frequency side of the carrier 2 away from each of the both end portions in the frequency direction of the carrier 2. In the embodiment, the PUCCH region R1 corresponds to the first physical uplink control channel region, and the PUCCH region R3 for the SeNB corresponds to the second physical uplink control channel region.

By providing the PUCCH region R3 for the SeNB in the carrier 2, a co-existence with the existing PUCCH region R1 is achieved, and at the same time, the control signal can be transmitted from the UE 100-1 to the SeNB 200-2 in the PUCCH region R3 for the SeNB.

Thus, the UE 100-1 transmits the control signal (the Ack/Nack, the downlink CSI report) corresponding to the carrier 2 in the PUCCH region R3 for the SeNB that are included in the carrier 2. On the other hand, the UE 100-2 that uses the carrier 2 as a PCell (a PCC) transmits the control signal (the Ack/Nack, the downlink CSI report) corresponding to the carrier 2 in the PUCCH region R1 included in the carrier 2.

In the example illustrated in FIG. 8, the PUCCH region R3 for the SeNB is provided adjacent to the PUCCH region R1 included in the carrier 2. Thus, the PUSCH region R2 is not divided by the PUCCH region R3 for the SeNB, and as a result, the effect on the assignment of the PUSCH resources can be reduced.

Furthermore, the PUCCH formats applicable to the PUCCH region R3 for the SeNB are different from the PUCCH formats applicable to the PUCCH region R1.

As described above, the PUCCH formats applicable to the existing PUCCH region R1 are the PUCCH formats 1, 1a, 1b, 2, 2a, 2b, and 3.

In contrast, the PUCCH formats applicable to the PUCCH region R3 for the SeNB are the PUCCH formats 4, 4a, 4b, 5, 5a, and 5b, for example. The PUCCH formats 4, 4a, and 4b correspond to the PUCCH formats 1, 1a, and 1b, respectively. The PUCCH formats 5, 5a, and 5b correspond to the PUCCH formats 2, 2a, and 2b, respectively.

Alternatively, the PUCCH formats applicable to the PUCCH region R3 for the SeNB are s-PUCCH formats 1, 1a, 1b, 2, 2a, and 2b, for example. The s-PUCCH formats 1, 1a, and 1b correspond to the PUCCH formats 1, 1a, and 1b, respectively. The s-PUCCH formats 2, 2a, and 2b correspond to the PUCCH formats 2, 2a, and 2b, respectively.

Thus, by specifying new PUCCH formats for the PUCCH region R3 for the SeNB, the existing PUCCH region R1 and the PUCCH region R3 for the SeNB can be made to co-exist appropriately.

(Operation Sequence According to Embodiment)

Figure 9:
FIG. 9 is a diagram illustrating a notification operation of a PUCCH region for SeNB according to the embodiment.

FIG. 9 is a diagram illustrating a notification operation of the PUCCH region R3 for the SeNB.

As illustrated in FIG. 9, the MeNB 200-1 transmits, to the UE 100-1, an RRC message including the configuration information indicating the PUCCH region R3 for the SeNB (PUCCH-Config). The configuration information indicating the PUCCH region R3 for the SeNB (the PUCCH-Config) includes the various parameters for defining the resource blocks configuring the PUCCH region. The various parameters are set (notified) for each PUCCH format. Focusing on the PUCCH region R3 for the SeNB, the various parameters are the parameters for a PUCCH format 4 (the Scheduling request, the Ack/Nack) or the parameters for a PUCCH format 5 (the CSI, the Ack/Nack), for example.

Furthermore, the MeNB 200-1 transmits, to the UE 100-1, an RRC message including the configuration information of the downlink CSI report (for example, CQI-ReportConfig) in the PUCCH region R3 for the SeNB. The configuration information of the downlink CSI report (for example, the CQI-ReportConfig) includes the parameters indicating the report cycle of the downlink CSI.

For example, SIB (System Information Block) type 2, which is a type of a common control signal, and RRC Connection Setup or RRC Connection Reconfiguration, which are a type of individual control signals can be used as the RRC message.

In TDD, the MeNB 200-1 transmits the RRC message to the UE 100-1 via the carrier 1. In FDD, the MeNB 200-1 transmits the RRC message to the UE 100-1 via the downlink carrier $f_{DL1}$ that forms a pair with a carrier 1 ($f_{UL1}$).

The UE 100-1 receives, from the MeNB 200-1, the RRC message including the configuration information indicating the PUCCH region R3 for the SeNB (the PUCCH-Config). On the basis of the configuration information (the PUCCH-Config), the UE 100-1 identifies the PUCCH region R3 for the SeNB.

Furthermore, the UE 100-1 receives, from the MeNB 200-1, the RRC message including the configuration information of the downlink CSI report (for example, the CQI-ReportConfig) in the PUCCH region R3 for the SeNB. On the basis of the configuration information (for example, the CQI-ReportConfig), the UE 100-1 performs downlink CSI report to the SeNB 200-2 in the PUCCH region R3 for the SeNB.

In the embodiment, after the radio communication using the carrier 2 becomes available, the UE 100-1 performs control to transmit the downlink CSI report corresponding to the carrier 2 in the PUCCH region R3 for the SeNB. That is, when it becomes possible to use the carrier 2 while the carrier 1 is being used, the UE 100-1 enables the configuration information of the downlink CSI report corresponding to the carrier 2 (for example, the CQI-ReportConfig).

In the dual connectivity, the UE 100-1 temporarily communicates with the SeNB 200-2 by using the connection with the MeNB 200-1 as the main connection and the connection with the SeNB 200-2 as the subordinate connection. Thus, by transmitting the configuration information concerning the PUCCH region R3 for the SeNB from the MeNB 200-1 to the UE 100-1, the MeNB 200-1 can perform an integrated control of the communication settings of the UE 100-1.

In order to share the configuration information transmitted to the UE 100-1 (the PUCCH-Config and the CQI-ReportConfig and the like) with the SeNB 200-2, the MeNB 200-1 may notify the configuration information (the PUCCH-Config and the CQI-ReportConfig and the like) to the SeNB 200-2. Alternatively, the SeNB 200-2 may determine the configuration information concerning the PUCCH region R3, and may notify the configuration information to the MeNB 200.

Figure 10:
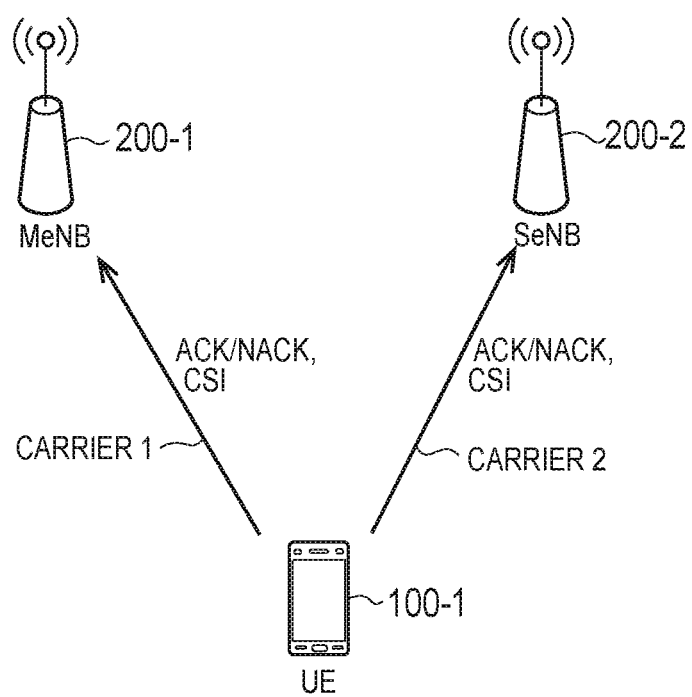
FIG. 10 is a diagram illustrating a transmission operation of a control signal by UE according to the embodiment.

FIG. 10 is a diagram illustrating a transmission operation of a control signal by the UE 100-1. First of all, the Ack/Nack will be described.

As illustrated in FIG. 10, the UE 100-1 transmits, to the MeNB 200-1, the Ack/Nack corresponding to the carrier 1 in the PUCCH region of the carrier 1. The MeNB 200-1 receives, from the UE 100-1, the Ack/Nack corresponding to the carrier 1 in the PUCCH region of the carrier 1. In TDD, the Ack/Nack corresponding to the carrier 1 is the Ack/Nack for the user data that the UE 100-1 receives from the MeNB 200-1 via the carrier 1. In FDD, the Ack/Nack corresponding to the carrier 1 is the Ack/Nack for the user data that the UE 100-1 receives from the MeNB 200-1 via the downlink carrier $f_{DL1}$ that forms a pair with the carrier 1 ($f_{UL1}$).

Furthermore, the UE 100-1 transmits, to the SeNB 200-2, the Ack/Nack corresponding to the carrier 2 in the PUCCH region R3 for the SeNB of the carrier 2. The SeNB 200-2 receives, from the UE 100-1, the Ack/Nack corresponding to the carrier 2 in the PUCCH region R3 for the SeNB of the carrier 2. In TDD, the Ack/Nack corresponding to the carrier 2 is the Ack/Nack for the user data that the UE 100-1 receives from the SeNB 200-2 via the carrier 2. In FDD, the Ack/Nack corresponding to the carrier 2 is an Ack/Nack for the user data that the UE 100-1 receives from the SeNB 200-2 via the downlink carrier $f_{DL2}$ that forms a pair with a carrier 2 ($f_{UL2}$).

Next, the downlink CSI report (a periodic downlink CSI report) will be described.

As illustrated in FIG. 10, the UE 100-1 transmits, to the MeNB 200-1, a downlink CSI report corresponding to the carrier 1 in the PUCCH region of the carrier 1. The MeNB 200-1 receives, from the UE 100-1, the downlink CSI report corresponding to the carrier 1 in the PUCCH region of the carrier 1. In TDD, the downlink CSI report corresponding to the carrier 1 is the CSI report about a reference signal and the like that the UE 100-1 receives from the MeNB 200-1 via the carrier 1. In FDD, the downlink CSI report corresponding to the carrier 1 is the CSI report about a reference signal and the like that the UE 100-1 receives from the MeNB 200-1 via the downlink carrier $f_{DL1}$ that forms a pair with the carrier 1 ($f_{DL1}$).

Furthermore, the UE 100-1 transmits, to the SeNB 200-2, a downlink CSI report corresponding to the carrier 2 in the PUCCH region R3 for the SeNB of the carrier 2. The SeNB 200-2 receives, from the UE 100-1, the downlink CSI report corresponding to the carrier 2 in the PUCCH region R3 for the SeNB of the carrier 2. In TDD, the downlink CSI report corresponding to the carrier 2 is the CSI report about a reference signal and the like that the UE 100-1 receives from the SeNB 200-2 via the carrier 2. In FDD, the downlink CSI report corresponding to the carrier 2 is the CSI report about a reference signal and the like that the UE 100-1 receives from the SeNB 200-2 via the downlink carrier $f_{DL2}$ that forms a pair with the carrier 2 ($f_{UL2}$).

The cycle in which the downlink CSI report corresponding to the carrier 2 is transmitted is different from the cycle in which the downlink CSI report corresponding to the carrier 1 is transmitted. In the embodiment, the cycle in which the downlink CSI report corresponding to the carrier 2 is transmitted is shorter than the cycle in which the downlink CSI report corresponding to the carrier 1 is transmitted. For example, the cycle in which the downlink CSI report corresponding to the carrier 2 is transmitted is half or less than the cycle in which the downlink CSI report corresponding to the carrier 1 is transmitted.

In the dual connectivity, the channel state between the UE 100-1 and the SeNB 200-2 is assumed to be better than the channel state between the UE 100-1 and the MeNB 200-1. Thus, by setting the cycle in which the downlink CSI report corresponding to the carrier 2 is transmitted to be shorter than the cycle in which the downlink CSI report corresponding to the carrier 1 is transmitted, the UE 100-1 can actively use the communication with the SeNB 200-2.

[First Modification]

In the above-described embodiment, the PUCCH region R3 for the SeNB is provided adjacent to the PUCCH region R1 included in the carrier 2 (see FIG. 8). However, the PUCCH region R3 for the SeNB may be provided separate from the PUCCH region RE FIG. 11 is a diagram illustrating an uplink subframe illustrating a first modification of the PUCCH region R3 for the SeNB. As illustrated in FIG. 11, the first modification is similar to the above-described embodiment in view of the point that the PUCCH region R3 for the SeNB extends along a time direction across one entire subframe. However, the first modification is different from the above-described embodiment in view of the point that the PUCCH region R3 for the SeNB illustrated in FIG. 11 is provided separate from the PUCCH region R1.

Furthermore, in the above-described embodiment, the PUCCH region R3 for the SeNB extends along the time direction (see FIG. 8). However, the PUCCH region R3 for the SeNB may extend along the frequency direction. FIG. 12 is a diagram illustrating an uplink subframe illustrating a second modification of the PUCCH region R3 for the SeNB. As illustrated in FIG. 12, in each of the first slot and the second slot, the PUCCH region R3 for the SeNB extends along the frequency direction between a pair of the PUCCH region RE In FIG. 12, the PUCCH region R3 for the SeNB extends across the entire interval between the pair of the PUCCH region R1, but as shown by the broken line, the PUCCH region R3 for the SeNB may be used by separating into a plurality of region. This is because when the UL bandwidth is large, and a signal is transmitted across the entire broad bandwidth, then depending on the path loss between the UE 100 and the eNB 200 and the settings of the transmission power control parameters, there are some UEs 100 that lie in the upper limit of the transmission power.

[Second Modification]

In the above-described embodiment, no particular consideration was given to the bandwidth of the carrier 2. However, when the bandwidth of the carrier 2 is narrow, then by providing the PUCCH region R3 for the SeNB in the carrier 2, it becomes impossible to provide the PUSCH region R2 in the carrier 2.

According to the current specifications, the minimum carrier bandwidth is 1.4 MHz, which is the bandwidth equivalent to six resource blocks. For example, when the PUCCH region R1 occupies a bandwidth equivalent to four resource blocks, and the remaining bandwidth equivalent to two resource blocks is set as the PUCCH region R3 for the SeNB, it becomes impossible to provide the PUSCH region R2 in the carrier 2. Thus, it is not preferable to provide the PUCCH region R3 for the SeNB in such a carrier bandwidth.

Therefore, the E-UTRAN 10 provides the PUCCH region R3 for the SeNB in the carrier 2 only when the bandwidth of the carrier 2 is more than the predetermined bandwidth. The predetermined bandwidth is the bandwidth that enables the provision of the PUSCH region R2 in the carrier 2 even when the PUCCH region R1 and the PUCCH region R3 for the SeNB have been provided in the carrier 2. Specifically, the predetermined bandwidth is the bandwidth corresponding to the total bandwidth that includes the minimum PUCCH region R1, the minimum PUSCH region R2, and the minimum PUCCH region R3 for the SeNB.

[Third Modification]

In the above-described embodiments, an operation environment in which a dual connectivity is applied to the UE 100-1 was assumed. However, the operation environment may be such that carrier aggregation (CA) is applied to the UE 100-1.

Figure 13:
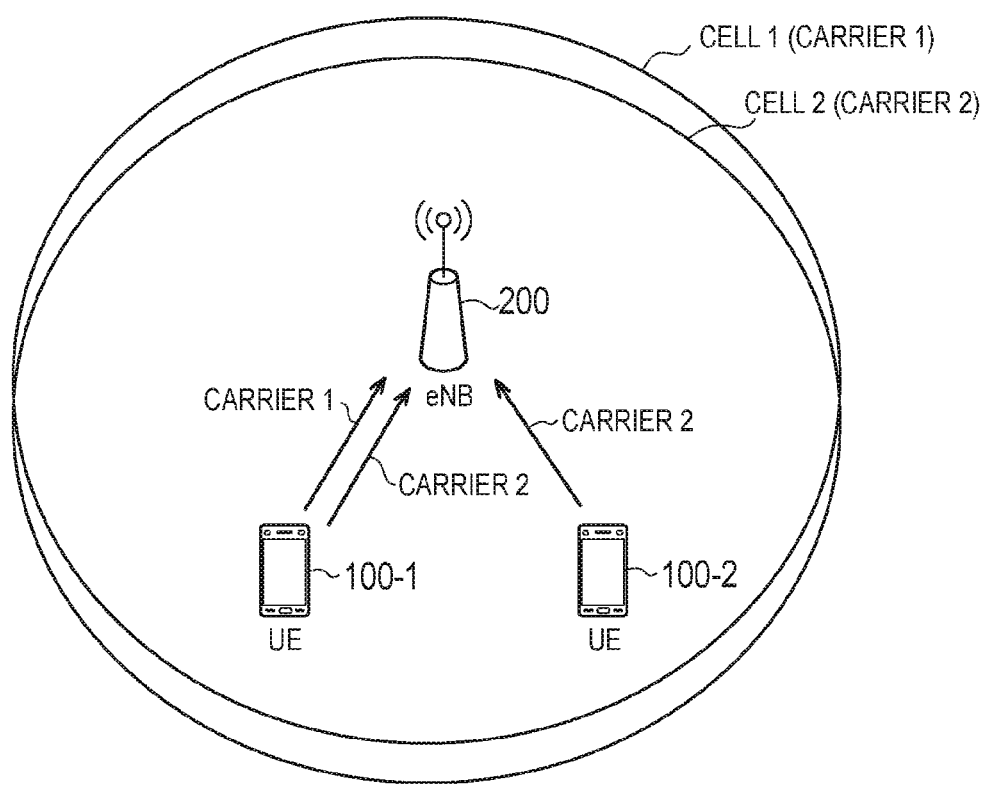
FIG. 13 is a diagram illustrating a modification of an operation environment according to the embodiment.

FIG. 13 is a diagram illustrating a modification of an operation environment. As illustrated in FIG. 13, the eNB 200 manages the cell 1 belonging to the carrier 1 (the first carrier) and the cell 2 belonging to the carrier 2 (the second carrier). In the example shown in FIG. 13, the cell 1 and the cell 2 have the same coverage size.

In TDD, the carrier 1 is a common carrier in the uplink and the downlink, and the carrier 2 is a common carrier in the uplink and the downlink. On the other hand, in FDD, the carrier 1 is the uplink carrier $f_{UL1}$, and the eNB 200 further manages the downlink carrier $f_{DL1}$ that forms a pair with the carrier 1. Furthermore, in FDD, the carrier 2 is the uplink carrier $f_{UL2}$, and the eNB 200 further manages the downlink carrier $f_{DL2}$ that forms a pair with the carrier 2.

The eNB 200 performs a mobility control (Mobility management) of the UE 100-1. The eNB 200 establishes an RRC connection with the UE 100-1, and performs a handover control and the like for the UE 100-1. The UE 100-1 performs uplink communication with the E-UTRAN 10 by simultaneously using a plurality of carriers (the carrier 1 and the carrier 2), and the scheduling in each carrier is performed by one eNB 200.

The carrier 1 is used in the mobility control of the UE 100-1. Focusing on the UE 100-1, the carrier 1 corresponds to PCC (Primary Component Carrier), and the cell 1 corresponds to PCell (Primary Cell). The carrier 2 provides radio communication to the UE 100-1 in coordination with the carrier 1. Focusing on the UE 100-1, the carrier 2 corresponds to SCC (Secondary Component Carrier), and the eNB 200 corresponds to SCell (Secondary Cell).

In such an operation environment, same as described in the above embodiment, by providing the PUCCH region R3 for the SCell (the second physical uplink control channel region) in the carrier 2, the UE 100-1 can transmit the control signal corresponding to the carrier 2 (SCell) in the PUCCH region R3 for the SCell.

Other Embodiments

In the above embodiment, an example was explained where the cycle in which the downlink CSI report corresponding to the carrier 2 is transmitted is set shorter than the cycle in which the downlink CSI report corresponding to the carrier 1 is transmitted. However, as explained in the third modification, in a case where carrier aggregation is applied, the cycle in which the downlink CSI report corresponding to the carrier 2 is transmitted may be set longer than the cycle in which the downlink CSI report corresponding to the carrier 1 is transmitted. This is because in the operation environment shown in FIG. 13, since the channel quality of each of the carrier 1 and the carrier 2 is the same, it is preferable to give priority to the downlink CSI report corresponding to the carrier 1, which is the main carrier.

In the above-described embodiments, a case in which the UE 100-1 simultaneously transmits a control signal and user data in the carrier 2 was not particularly dealt with. However, the assignment of the PUCCH resources in the PUCCH region R3 for the SeNB (the PUCCH region for the SCell) in the carrier 2, and the assignment of the PUSCH resources in the PUSCH region R2 of the carrier 2 can be made to occur simultaneously. In such a simultaneous occurrence, it is preferable for the UE 100-1 to perform either of the below-described first operation and the second operation.

The first operation is an operation by which the UE 100-1 transmits all signals including the control signal on the PUSCH (non-transmission on the PUCCH). In this way, the control signal and the user data can be transmitted collectively on the PUSCH.

The second operation is an operation by which simultaneous transmission of the PUSCH and the PUCCH is performed. In this way, an effective use of the PUSCH resource can be made.

Furthermore, in each of the above-described embodiments, as one example of the cellular communication system, the LTE system is described. However, the present invention is not limited to the LTE system, and the present invention may be applied to systems other than the LTE system.

[Additional Statement]

Below, supplementary notes of above-described embodiments will be described.

It was agreed that the CP (Control Plane) architecture for dual connectivity will be based on Option C1 as baseline. Although Option C2 is not ruled out, substantial benefits should be evident before Option C2 should be considered. One aspect of the dual connectivity that needs to be resolved is the handling of RLF (Radio Link Failure) conditions. The issues of RLF related to RLM (Radio Link Monitoring) of SeNB 200-2, loss of connection with the MeNB 200-1, dual connectivity activation and RACH failure (random access failure) will be considered.

Both dual connectivity and CA has the benefit of increasing user-throughput by allowing the UE 100 to connect simultaneously to multiple cells. To prevent unnecessary complexity for both the UE 100 and the NW it would be preferable for the CP architecture of CA to be reused in dual connectivity's CP architecture as much as possible. However, the reuse of the CA procedures should be done with caution to prevent any significant degradation to dual connectivity performance. In the RLF discussions below, RLF related issues for dual connectivity are discussed in context of the existing procedures for CA.

(RLM of the SeNB)

In CA, RLM isn't supported on the Scell since PCell uses CQI and measurement reports to determine the status of the SCell, including addition/activation and possible RLE In dual connectivity, the situation isn't as simple, since it is assumed that the SeNB 200-2 has its own scheduler and the latency in the Xn interface may be excessive, it's reasonable for the UE 100 to send CQI to the MeNB 200-1 and the SeNB 200-2. Furthermore, even if the UE 100's radio link to the MeNB 200-1 has failed, the UE 100's radio link to the SeNB 200-2 may be perfectly fine. If the UE 100 only applies RLM to the MeNB 200-1, the UE 100 would be required to declare RLF when only the link to the MeNB 200-1 fails. Therefore, it would be beneficial to also allow the UE 100 to also apply RLM of the SeNB 200-2.

Proposal 1: As a baseline, UE 100 should send CQI to the MeNB 200-1 and the SeNB 200-2.

Proposal 2: UE 100 should also apply RLM to the SeNB 200-2.

If Proposal 2 is agreeable, it will also be necessary to determine whether the MeNB 200-1 needs to know the status of the RLM. As explained, it would be necessary for the MeNB 200-1 to remove the SeNB 200-2 as soon as possible to prevent the UE 100 from sending further SRS to the SeNB 200-2 in case UL transmission to the SeNB 200-2 is also allowed. Additionally, if the MeNB 200-1 knows the RLF status of the SeNB 200-2, the MeNB 200-1 could configure the UE 100 with measurement of other candidate inter-frequency SeNB 200-2s. Although either SeNB 200-2 or UE 100 may inform the MeNB 200-1 of the SeNB 200-2's RLF status, in case the backhaul latency is excessive, it may be preferable for the UE 100 to provide the SeNB 200-2's RLF status to the MeNB 200-1.

Proposal 3: MeNB 200-1 should be notified of the SeNB 200-2's RLF status.

Assuming Proposal 3 is agreed, it is also necessary to determine the form of the notification of the SeNB 200-2's RLF status to the MeNB 200-1. One possibility would be for the UE 100 or the SeNB 200-2 to send indication to the MeNB 200-1 only after the UE 100 has declared RLF with the SeNB 200-2. However, it may also be beneficial for the MeNB 200-1 to obtain the CQI information of the SeNB 200-2 to better monitor the link to the SeNB 200-2 since the MeNB 200-1 is responsible for the addition/removal/switching of the SeNB 200-2. Currently, the UP architecture is still uncertain, but if one of the Alt 3 options were adopted with the bearer split option, it would be up to the MeNB 200-1 to determine the traffic that would be steered toward the SeNB 200-2. Having the CQI of the SeNB 200-2 would also be beneficial for the MeNB 200-1 to decide on the bearer split.

Proposal 4: As a baseline, UE 100 should send CQI of the SeNB 200-2 to the MeNB 200-1. It is FFS whether additional information from CSI is also needed.

(RLF with the MeNB 200-1)

Thus far it is assumed that the CP architecture is based on Option C1 which means there is only one RRC entity in the UE 100 and since the MeNB 200-1 is the anchor eNB, it will coordinate all mobility functions for the UE 100. If Proposal 1 is agreed and the UE 100 also monitors the SeNB 200-2's radio link, this means there may be a situation the UE 100 may only have connection with the SeNB 200-2 and not the MeNB 200-1 due to poor link condition. Under this scenario, it is necessary to determine whether the UE 100 could continue the connection with only the SeNB 200-2 under Option C1. This issue has also been addressed. In order for the SeNB 200-2 to serve the UE 100 with mobility functionality, the SeNB 200-2 need to have a means to maintain RRC functionality with the UE 100. The following options may be considered.

Option 1. The SeNB 200-2 should be removed and the UE 100 can attempt to re-establish with the MeNB 200-1. This is similar to the CA case where the UE 100 deactivates the SCell when the UE 100 triggers RLF with the PCell.

Option 2. The MeNB 200-1 should inform the SeNB 200-2 of the UE 100's RLF condition with the MeNB 200-1. This could trigger the SeNB 200-2 to establish an SRB with the UE 100 so that RRC functionality can be restored with the SeNB 200-2. The MeNB 200-1 should also send the UE 100's context to the SeNB 200-2.

Option 1 above is similar to the CA case where the UE 100 deactivates the SCell when the UE 100 triggers RLF with the PCell, but it would require that the UE 100's connection to the SeNB 200-2 is also removed which is counter to the reasoning for monitoring the radio link of the SeNB 200-2.

With Option 2, UE 100's connection with the SeNB 200-2 may be maintained, but it'll be necessary for the MeNB 200-1 to notify the SeNB 200-2 of the RLF condition. Since the UE 100 no longer has RRC functionality with the SeNB 200-2, there is no means for the UE 100 to notify the SeNB 200-2 of the RLF condition. And with option 2, once the SeNB 200-2 establishes an SRB with the UE 100, it would be possible for the MeNB 200-1 to send RRC messages to the UE 100 via the SeNB 200-2's Uu interface.

Proposal 5: With CP architecture Option C1, if the UE 100 experiences RLF with the MeNB 200-1, the MeNB 200-1 should inform the SeNB 200-2 of the UE 100's RLF condition with the MeNB 200-1 so that the SeNB 200-2 can establish an SRB with the UE 100 to restore the RRC functionality with the MeNB 200-1.

Although Option C1 is considered as the baseline CP architecture, one potential benefit with Option C2 is the possibility that the UE 100 may keep RRC connection with the SeNB 200-2 without significant changes to Option C2. Although the main intention of SeNB 200-2's RRC connection is to serve the functionality specific to the SeNB 200-2 (e.g., RRM for the SeNB 200-2 and not the MeNB 200-1), it may be possible to extend the SeNB 200-2's RRC functionality to handle abnormal conditions such as RLF with MeNB 200-1. For example, UE 100 could fall back to the single cell operation with the SeNB 200-2 or the UE 100 may be allowed to retain the connection with the MeNB 200-1 through the Uu interface with the SeNB 200-2.

Proposal 6: It should be considered whether Option C2 offers any advantage over Option C1 in the case the UE 100 experiences RLF with the MeNB 200-1.

(Dual-Connectivity Activation)

The activation of dual connectivity should also be considered as a comparison between Option C1 and Option C2. Dual-connectivity activation procedure may differ depending on whether the UE 100 is initially connected to the small cell or the macrocell. With Option C1, if the UE 100 is initially camped on a small cell, the small cell will likely need to handover the UE 100 to the MeNB 200-1 prior to dual connectivity since the UE 100 should only have RRC connection with the MeNB 200-1. One way to avoid the need for the handover from the small cell to the MeNB 200-1 prior to dual connectivity is to ensure that the UE 100 always camp on MeNB 200-1 since only the MeNB 200-1 will configure dual connectivity. However, since the small cell has to support legacy UEs, it must be able to support legacy UEs as a standalone cell. So it may be difficult to prevent UEs 100 from camping on small cells. It is FFS whether further enhancements are needed for the Cell Reselection procedure for dual connectivity capable UEs 100.

Proposal 7: It should be considered whether enhancements are needed for Cell Reselection procedure for dual connectivity capable UEs 100.

With Option C2, although the same procedure may be applied as in Option C1, there is the possibility that the small cell could establish the UE 100's dual connectivity with the MeNB 200-1 without first handing over the UE 100 to the MeNB 200-1, since the small cell has RRC connection with the UE 100 over the Uu interface. This would simplify the idle mobility procedure since there is no difference whether the UE 100 is initially connected to the MeNB 200-1 or the SeNB 200-2 before dual connectivity is activated. Therefore, RAN2 should introduce a procedure that allows the UE 100 to keep RRC connection with one node when UE 100 enter under the dual connectivity operation in Option C2. Whether such a procedure is feasible or not depends on which entity is allowed to initiate the dual connectivity. If only the MeNB 200-1 can configure dual connectivity, this kind enhancement will not be possible.

Proposal 8: If Option C2 is adopted, it should be considered that the possibility of allowing the small cell to initiate dual connectivity with the MeNB 200-1.

(RACH)

Currently for CA, RAR is only sent from the PCell; however, this is based on the ideal backhaul which isn't the case for dual connectivity. In dual connectivity, if we assume that the UE 100 can transmit to both MeNB 200-1 and SeNB 200-2, then the UE 100 will send a RACH preamble to the SeNB 200-2. However, if the UE 100 can only receive RAR from the MeNB 200-1, depending on the latency of the Xn interface, this may adversely affect how the network can adequately determine the proper value for the T300 timer. Therefore, it would be better to allow the SeNB 200-2 to send the RAR to the UE 100. If the RAR is sent from the MeNB 200-1 then it is also necessary for the MeNB 200-1 to know the RACH status, in particular, if the RACH fails since the MeNB 200-1 is responsible for configuring dual connectivity. Then the SeNB 200-2 or the UE 100 should inform the MeNB 200-1 of RACH failures.

Proposal 9: When the UE 100 sends RACH preamble to the SeNB 200-2, the SeNB 200-2 should send the RAR to the UE 100.

Proposal 10: The SeNB 200-2 or the UE 100 should inform the MeNB 200-1 of RACH failures.

CONCLUSION

In this additional statement, we discussed the issues related to RLF in dual connectivity. In particular, the handling of RLF is compared with similar procedures in CA with Option C1 as the baseline assumption. In some cases, the use of Option C2 may have some benefits over Option C1.

CROSS REFERENCE

The entire contents of U.S. Provisional Application No. 61/864,186 (filed on Aug. 9, 2013) and U.S. Provisional Application No. 61/883,619 (filed on Sep. 27, 2013) are incorporated herein by reference.

INDUSTRIAL APPLICABILITY

The present invention is useful for mobile communication fields.

The invention claimed is:

1. A user terminal comprising:
a controller configured to perform uplink communication with a radio access network by simultaneously using a plurality of carriers, wherein
the plurality of carriers comprise: a first carrier used for mobility control of the user terminal; and a second carrier that provides radio communication in coordination with the first carrier,
the first carrier comprises a first physical uplink control channel region provided at each of both end portions in a frequency direction of the first carrier,
the second carrier comprises a second physical uplink control channel region provided at a center frequency side of the second carrier away from each of both end portions in a frequency direction of the second carrier, and
the second physical uplink control channel region is provided in the second carrier, only when a bandwidth of the second carrier is wider than a predetermined bandwidth.

2. The user terminal according to claim 1, comprising:
a receiver configured to receive configuration information about the second physical uplink control channel region, via the first carrier or via a downlink carrier that forms a pair with the first carrier.

3. The user terminal according to claim 1, wherein a physical uplink control channel format applied to the second physical uplink control channel region is different from a physical uplink control channel format applied to the first physical uplink control channel region.

4. The user terminal according to claim 1, comprising:
a transmitter configured to transmit HARQ Ack/Nack corresponding to the second carrier, in the second physical uplink control channel region.

5. The user terminal according to claim 1, comprising:
a transmitter configured to transmit a downlink channel state report corresponding to the second carrier, in the second physical uplink control channel region.

6. The user terminal according to claim 5, wherein the controller is further configured to control to transmit a downlink channel state report corresponding to the second carrier, in the second physical uplink control channel region, after the radio communication using the second carrier becomes available.

7. The user terminal according to claim 6, wherein the transmitter is further configured to transmit a downlink channel state report corresponding to the first carrier, in the first physical uplink control channel region, and
a cycle in which a downlink channel state report corresponding to the second carrier is transmitted has a different period from a period of a cycle in which the downlink channel state report corresponding to the first carrier is transmitted.

8. The user terminal according to claim 1, wherein the second carrier further comprises a first physical uplink control channel region provided at each of both end portions in a frequency direction of the second carrier, and the second physical uplink control channel region is provided adjacently to the first physical uplink control channel region included in the second carrier.

9. The user terminal according to claim 1, wherein the second carrier is capable of operating as a first carrier used for mobility control of another user terminal, the second carrier further comprises a first physical uplink control channel region provided at each of both end portions in a frequency direction of the second carrier, the another user terminal transmits at least one of the HARQ Ack/Nack corresponding to the second carrier and a downlink channel state report corresponding to the second carrier, in the first physical uplink control channel region included in the second carrier, and the user terminal is connectable to the radio access network to which the another user terminal connects.

10. A radio access network comprising:
a base station configured to perform uplink communication with a user terminal by simultaneously using a plurality of carriers, wherein
the plurality of carriers comprise: a first carrier used for mobility control of the user terminal; and a second carrier that provides radio communication in coordination with the first carrier,
the first carrier comprises a first physical uplink control channel region provided at each of both end portions in a frequency direction of the first carrier,
the second carrier comprises a second physical uplink control channel region provided at a center frequency side of the second carrier away from each of both end portions in a frequency direction of the second carrier, and
the second physical uplink control channel region is provided in the second carrier, only when a bandwidth of the second carrier is wider than a predetermined bandwidth.

* * * * *